US009269092B2

(12) United States Patent
Dyer (10) Patent No.: US 9,269,092 B2
(45) Date of Patent: Feb. 23, 2016

(54) TARGETED ON-HOLD MESSAGING SYSTEM AND METHOD THEREOF

(76) Inventor: Robert G. Dyer, Tucson, AZ (US)

(\*) Notice: Subject to any disclaimer, the term of this patent is extended or adjusted under 35 U.S.C. 154(b) by 346 days.

(21) Appl. No.: 13/430,535

(22) Filed: Mar. 26, 2012

(65) Prior Publication Data

US 2012/0328088 A1 Dec. 27, 2012

Related U.S. Application Data

(60) Provisional application No. 61/467,248, filed on Mar. 24, 2011.

(51) Int. Cl.
*H04M 1/64* (2006.01)
*H04M 15/06* (2006.01)
*G06Q 30/02* (2012.01)
*H04M 3/428* (2006.01)
*H04M 3/42* (2006.01)
*H04M 3/487* (2006.01)

(52) U.S. Cl.
CPC ............. *G06Q 30/02* (2013.01); *H04M 3/4285* (2013.01); *H04M 3/42068* (2013.01); *H04M 3/4878* (2013.01)

(58) Field of Classification Search
USPC ...................................................... 379/88.22
See application file for complete search history.

(56) References Cited

U.S. PATENT DOCUMENTS

| 5,867,562 | A  | * | 2/1999  | Scherer ................. 379/88.21 |
| 6,683,941 | B2 | * | 1/2004  | Brown et al. .......... 379/88.22 |
| 7,142,846 | B1 | * | 11/2006 | Henderson ........ H04M 1/2745 340/7.55 |
| 7,251,318 | B1 | * | 7/2007  | Henderson ........ H04M 1/2745 340/7.56 |
| 7,792,257 | B1 | * | 9/2010  | Vanier et al. ............ 379/114.13 |
| 8,737,591 | B2 | * | 5/2014  | Andronikov et al. .... 379/218.01 |
| 2005/0147212 | A1 | * | 7/2005 | Benco .................. H04M 3/428 379/84 |
| 2005/0216949 | A1 | * | 9/2005 | Candelora .......... H04N 21/2182 725/134 |
| 2007/0099651 | A1 | * | 5/2007 | Strasser ............ H04M 1/72513 455/550.1 |
| 2009/0063281 | A1 | * | 3/2009 | Haldeman et al. ............. 705/14 |
| 2012/0315880 | A1 | * | 12/2012 | Peitrow et al. ............. 455/412.1 |

\* cited by examiner

*Primary Examiner* — Joseph T Phan
(74) *Attorney, Agent, or Firm* — Dale F. Regelman; Quarles & Brady LLP (57) ABSTRACT

A method for providing on-hold messaging, wherein the method receives a telephone call placed by a caller to a target, generates caller information, selects a first message based on that caller information, and recites the first message prior to the target answering the telephone call.

14 Claims, 11 Drawing Sheets

TARGETED ON-HOLD MESSAGING SYSTEM AND METHOD THEREOF

CROSS-REFERENCE TO RELATED APPLICATIONS

This application incorporates by reference and claims priority to the U.S. Provisional Application Ser. No. 61/467,248, which was filed on Mar. 24, 2011.

TECHNICAL FIELD

The present invention relates to a system and method of creating and delivering on-hold messages targeted to the caller.

BACKGROUND ART

An individual on a phone call may be placed on hold in a number of scenarios. One common scenario includes placing a call to a customer service operator. Another includes calling into an audio conference. And yet another includes waiting for the other party who is on a second line (i.e., call waiting). Even within a single phone call, the caller may be placed on hold numerous times. For example, when a customer (i.e., the caller) phones a construction company, the customer may be placed on hold to listen to an introductory message about the company, its location, and its hours. The customer may remain on hold until a receptionist is available to take the call. After speaking with the receptionist, the customer may be placed back on hold while the receptionist locates the particular individual who the customer wishes to speak.

In some scenarios, such as call waiting, the line is typically silent when on hold. In business scenarios, however, the silence is often filled with audio, which serves the dual purpose of entertaining the on-hold caller and providing an indication that the call is still connected. In some instances, the audio may be in the form of music, often referred to as "music on hold". It other instances, it may be in the form of a spoken message, often referred to as "message on hold" or "on-hold messaging". On-hold messaging is used to convey information, such as information about the callee, to the on-hold caller.

Conveying information by on-hold messaging is appealing because the caller is a captive audience who will generally remain on the call until taken off hold. As such, callees often use this opportunity to communicate with the caller. Many businesses provide voice talent for creating messages for those companies who would like to leverage on-hold messaging. Companies, to provide information about the company, often create these messages. For example, the on-hold message for a dentist's office may provide the location and hours of operation of the office. The message may also extol the virtues of the office and the quality of the dentists and staff. For other types of businesses, these messages can be used to educate, inform, and entertain callers about the products and services offered by the business as well as pitch new products and services. For example, when a customer calls the customer services department of his internet service provider, an on-hold message may inform him that the provider now offers new high speed data connection options.

Traditional on-hold messages contain information focused on the business itself (i.e., the "callee"). To the extent that the on-hold message includes an advertisement, the advertisement is typically centered on, or related to, the callee or its partner businesses. The effectiveness of on-hold messages, however, could be increased by focusing the message to the caller instead of the callee.

Current traditional telephones systems are capable of identifying the phone number of the caller and, in most instances, the caller's identity. In addition, additional information relating to a phone number or to the caller is electronically available via public and private internet-provided services, such as reverse number lookup, area code mapping, location based services, social networking sites, and the like.

Accordingly, it would be an advance in the state of the art to provide a system and method for effectively delivering advertisements and/or informational messages targeted to the individual caller based on information derived from the call in combination with other sources related to the caller.

The approaches described in this section are those that could, but have not yet necessarily, been conceived or pursued. Accordingly, inclusion in this section should not be viewed as an indication that the approach described is prior art unless otherwise indicated.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 1A:
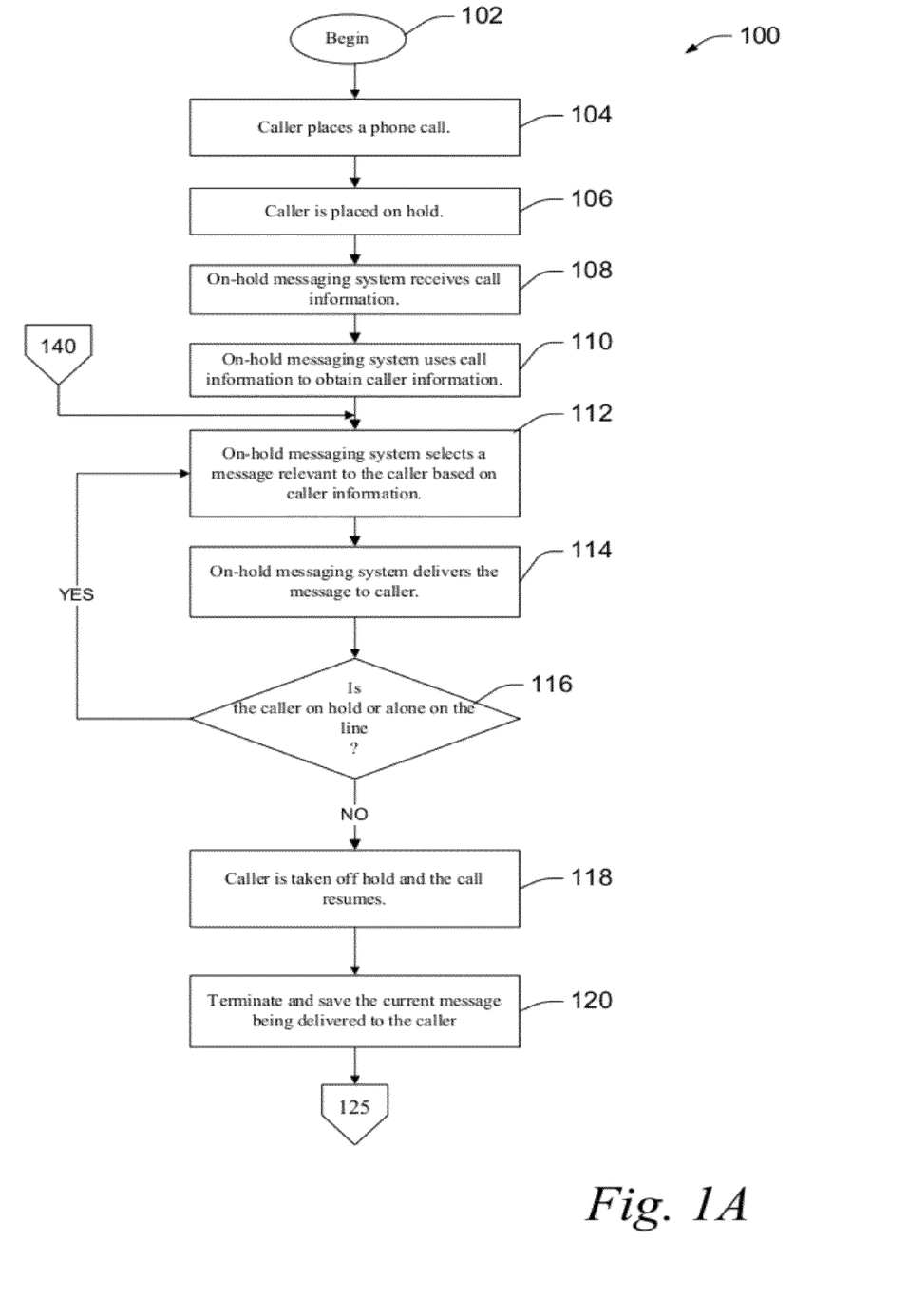
FIG. 1A summarizes Applicant's method for delivering targeted on-hold messages during a phone call.

Referring to FIG. 1A, a flowchart 100 depicting an exemplary method for delivering targeted on-hold messages during a phone call is depicted. The method begins at 102. The caller places a phone call to a target at step 104. As used herein, unless otherwise specified, the term "caller" includes both the party called (i.e., caller) as well as the party being called (i.e., target). The caller is placed on hold in step 106. In one embodiment, the caller is placed on hold immediately upon placing the call. In one embodiment, the caller is placed on hold in the midst of the call.

The on-hold messaging system receives information relating to the call from the telephone network at step 108. In one embodiment, this information, which is available on most telephone networks, includes the phone numbers of each caller. The phone numbers can be obtained by capturing the number dialed by the calling party, by using Caller Identification (Caller ID) technology, or by using other automatic number identification technologies. In one embodiment, this information includes the time and geographic location associated with the phone number for each caller.

The on-hold messaging system uses the information relating to the call to obtain information relating to the caller on hold at step 110. Caller information can come from a variety of sources, primarily obtained through electronic services and the Internet. For example, once the phone number is determined, an attempt can be made to establish the identity of the on-hold caller and further gather information relating to the established identity of the on-hold caller from public and private data sources. In one embodiment, given a phone number, a reverse telephone number lookup service is used to determine the identity of the individual registered with the phone number. While this is no guarantee, in this embodiment, that the actual caller is the same individual registered with the phone number, use of the call information drastically increases the likelihood that the targeted information will be applicable to the individual receiving the information. In addition, the targeted information will also be relevant in many cases to other parties who are likely to use the phone number, such as family members.

Once an identity is established, basic demographic information can be determined by, for example, a reverse telephone lookup service or other online directory service. In different embodiments, the demographic information contains the caller's occupation, sex, birth date, age, spouse, relatives, current and previous addresses, or a combination thereof.

The on-hold messaging system selects a relevant message based on the information relating to the caller at step 112. In one embodiment, the message is selected from a database of available messages. Metadata is also associated with each available message. The metadata includes key attributes for each message, which enables the on-hold messaging system to select a particular message that is more relevant than other messages based on the information relating to the caller. The metadata is for each message may be of a commercial or non-commercial nature and will vary for each message and is, in general, selected for the purpose of matching particular personal qualities with particular keywords. In different embodiments, the metadata is determined by market research, provided by the company sponsoring a particular message, based on general knowledge, or based on particular words contained in the message itself. An algorithm processes the caller's information and attempts to match this information to the message metadata.

For example, the on-hold messaging system may match a caller identified as a married female artist to the metadata associate with a municipal announcement for a local community art show the coming weekend. The metadata in this example would include information, such as, "art" and the location of the art show. In this simplified example, the algorithm matches "artist" with "art" and the location of the caller, approximated by the area code, current address information, or GPS information provided by the phone, with the actual location of the art show as contained in the metadata. For another example, the on-hold messaging system may match a caller in a particular location with a weather alert for that area by matching location information associated with the caller (or call) with the location information in the metadata.

The on-hold messaging system delivers the selected on-hold message to the on-hold caller at step 114. The message is fed into the public switched telephone network (PSTN), a private branch exchange (PBX), or the internet via voice over internet protocol (VOIP), to reach the on-hold caller. The message continues to play until the caller is taken off hold, upon which the caller is reconnected to the other parties on the call.

Once playback of the selected message is complete, the method determines at step 116 whether the caller is still on hold, or is alone on the line. If the method determines that the caller is still on hold, or alone on the line, the method transitions to 112.

If the method determines that the caller is no longer on hold, or is no longer alone on the line, the method transitions to step 118 wherein the call resumes. In step 120, the method terminates and saves the current message being delivered to the caller.

Figure 1B:
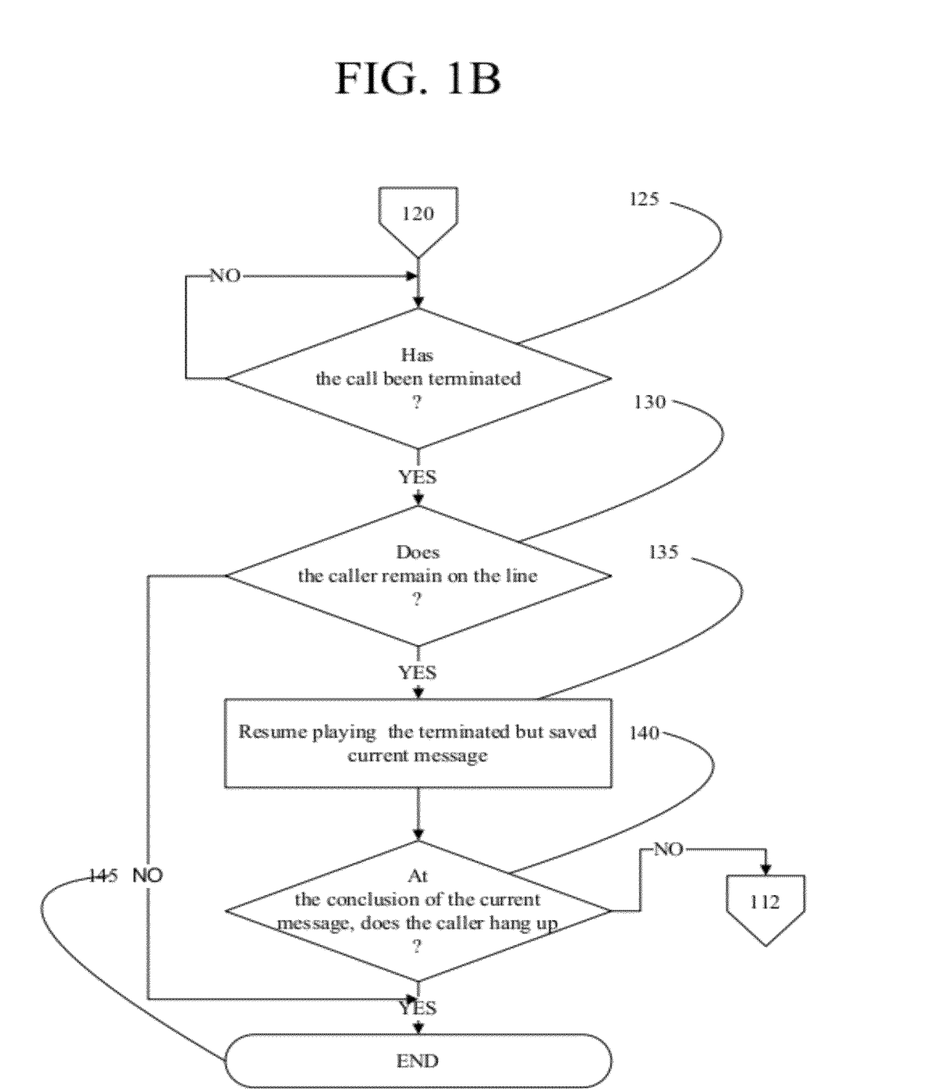
FIG. 1B summarizes certain additional features in Applicant's method of FIG. 1A.

Referring to FIG. 1B, the method transitions from step 120 to step 125 wherein the method determines if the call has been terminated. If the method determines in step 125 that the call has not been terminated, then the method pauses before repeating step 125. Alternatively, if the method determines in step 125 that the telephone call between the caller and the recipient has been terminated, then the method transitions from step 125 to step 130 wherein the method determines if the caller remains on the line.

If the method determines in step 130 that the caller does not remain on the line, then the method transitions from step 130 to step 145 and ends.

Alternatively, if the method determines in step 130 that the caller does remain on the line, then the method transitions from step 130 to step 135 wherein the method resumes playing the terminated but saved current message. The method transitions from step 135 to step 140 wherein the method determines at the conclusion of the current message if the caller hangs up.

If the method determines in step 140 that at the conclusion of the current message the caller hangs up, then the method transition from step 140 to step 145 wherein the method ends. Alternatively, if the method determines in step 140 that at the conclusion of the current message the caller does not hang up, then the method transitions from step 140 to step 112 and continues as described herein.

Applicant's method includes another embodiment wherein in steps 130 through 140, the determination is made if the target remains on the line, and if so, the method selects and recites messages based upon target information.

Figure 2:
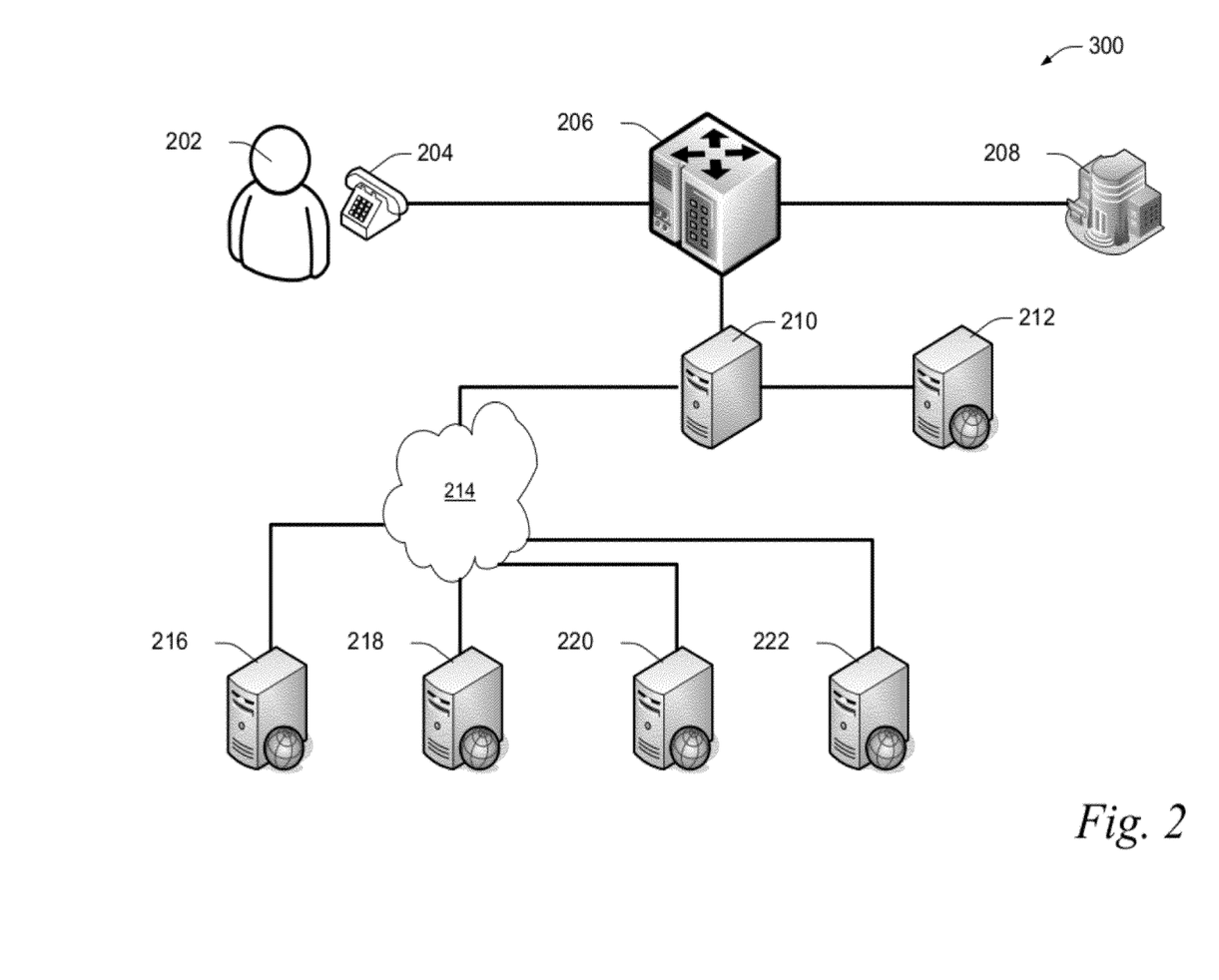
FIG. 2 is a block diagram depicting an exemplary embodiment of Applicant's system to deliver targeted advertisements via on-hold messaging for traditional phone calls.

Referring to FIG. 2, a block diagram 200 of an exemplary embodiment of a system to deliver targeted advertisements via on-hold messaging for phone calls is depicted. A caller 202 initiates a phone call using phone 204 to customer service at a business 208. The call is routed through a switching system 206. In different embodiments, the switching system 206 is a PSTN, a PBX, or a combination thereof. The caller 202 is placed on hold until a customer service representative at the business 208 becomes available to take the call. In one embodiment, the switching system 206 is operated by the business 208.

The caller 202 is placed on hold by the switching system 206. The switching system 206 gathers information pertaining to the call that is generally available on telephone networks, such as Caller ID. The switching system 206 passes the call information to the on-hold messaging computer 210. In one embodiment, the on-hold messaging system 210 is operated by the business 208. In one embodiment, the on-hold messaging system 210 is operated by a third party providing on-hold messaging services to multiple businesses, including business 208.

The on-hold messaging system 210 uses the call information in an attempt to derive information about the caller from any number of electronic sources 216-222. The on-hold messaging system 210 is connected to the electronic sources 216-222 by a network 214. In one embodiment, the network 214 is the Internet. Examples of such sources include a reverse number lookup directory 216, area code location database 218, and electronic white pages 220.

In different embodiments, the sources also include information from Internet-based social networking sites 222 that contain information about the identified caller, such as LinkedIn, Facebook, MySpace, and Twitter.

The on-hold messaging system 210 selects a message from a message database 212 based on the information pertaining to the call and the identified caller. In one embodiment, the message is selected by comparing metadata associated with the messages in the message database 212 to call and/or caller information. In one embodiment, if caller information cannot be derived from the electronic sources 216-222, the message is selected based on the call information only. In one embodiment, if neither call or caller information can be derived, the message is selected based on any information available, such as the identity of the business 208 being called. In this case, an on-hold message may be selected relating to new products and services offered by the business 208.

The messages in the database 212 are provided by any number of parties, including the business 208, other third party businesses, and governmental entities. The business 208 may collect ad revenue for using messages by these third parties.

Figure 3:
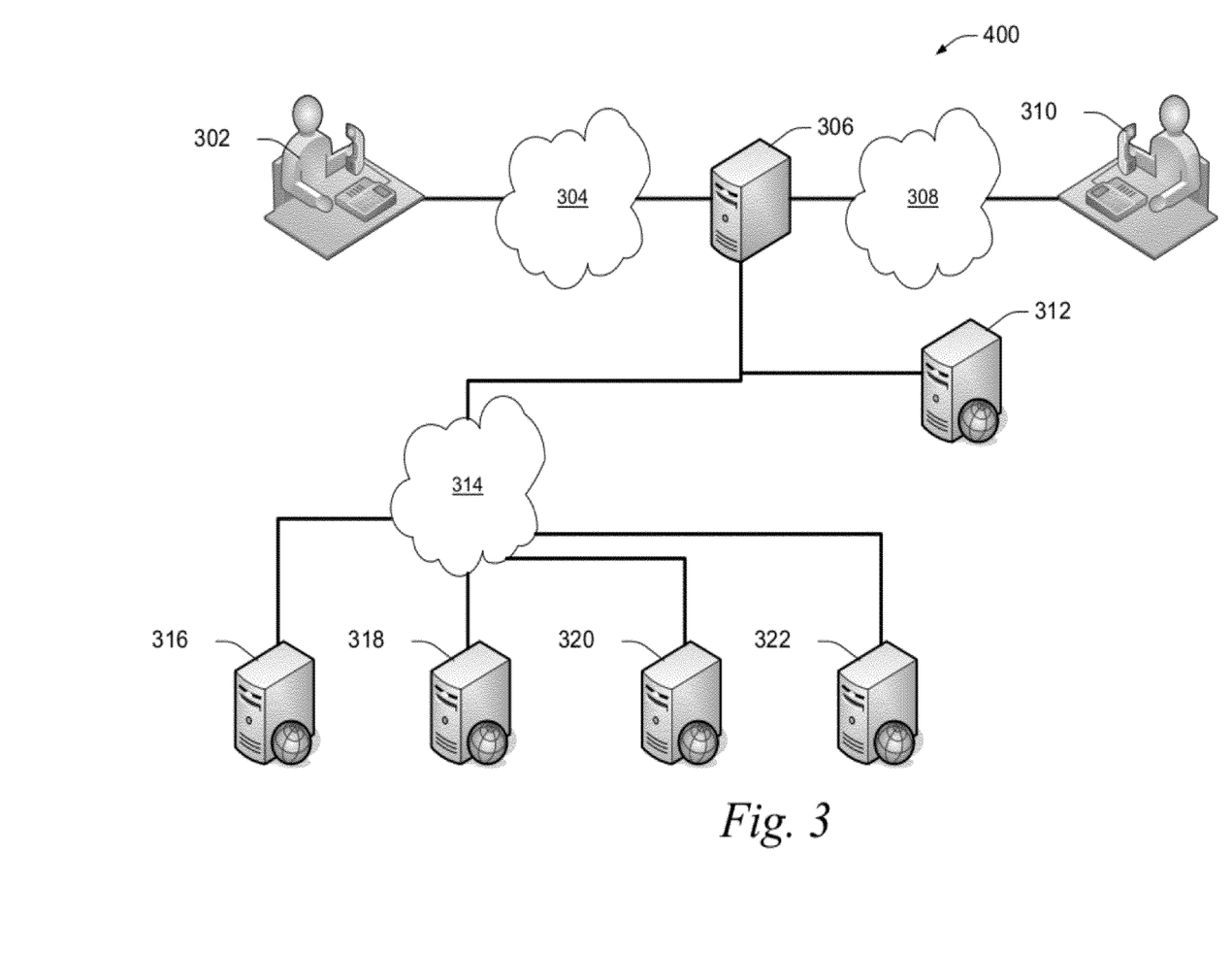
FIG. 3 is a block diagram depicting an exemplary embodiment of a system to deliver targeted advertisements via on-hold messaging for Voice Over Internet Protocol (VOIP) calls.

Referring to FIG. 3, a block diagram of an exemplary embodiment of a system to deliver targeted advertisements via on-hold messaging for Voice Over Internet Protocol (VOIP) calls is depicted. A first caller 302 initiates a VOIP call to a second caller 310. The first caller 302 is connected through a network 304 to a server 306. The second caller 310 is connected through a network 308 to the server 306. In different embodiments, the network 304 and 306 is the Internet, a private network, or a combination thereof. The server 306 handles the call and directs the Internet Protocol (IP) packets containing call information over a packet-switched network. In one embodiment, the server 306 handling the call comprises a server farm of two or more servers.

The server 306 handles all aspects of the call, including responding to a request to place a caller on hold. The server 306 also includes an on-hold messaging system for delivering targeted messages. When caller 310 places the other caller 302 on hold, the server 306 responds accordingly and switches the caller's 310 line to a hold line. Once caller 302 is placed on hold, server 306 gathers information about the call. In many instances, the call information available for VOIP calls includes much more information about the caller than traditional phone calls. Similarly, a VOIP identity (i.e., number or username, depending on the VOIP service) is more likely to be associated with a single user as opposed to being shared as is the case for a traditional telephone number.

The server 306, using information about the call available on the VOIP system, gathers information or additional information relating to the caller 302. The one-hold messaging system on server 306 is connected to the electronic sources 316-322 by a network 314. In one embodiment, the network 314 is the Internet. Examples of such sources include a reverse number lookup directory 316, area code location database 318, and electronic white pages 320. In different embodiments, the sources also include information from Internet-based social networking sites 322 that contain information about the caller 302, such as LinkedIn, Facebook, MySpace, and Twitter.

Database 312 contains numerous messages and corresponding metadata for each message. The metadata includes key attributes for each message, which enables the on-hold messaging system to select a particular message that is more relevant to the caller than other messages based on the information relating to the caller. The metadata for each message may be of a commercial or non-commercial nature and will vary for each message and is, in general, selected for the purpose of matching particular personal qualities with particular keywords. In different embodiments, the metadata is determined by market research, provided by the party sponsoring a particular message, based on general knowledge, or based on particular words contained in the message itself.

The on-hold messaging system on server 306 uses information about the call and caller to select a message in database 312. In one embodiment, the on-hold messaging system matches call or caller information with the message metadata to identify a message that is more applicable, or at least as applicable, to the likely caller (i.e., targeted to the likely caller) than the other non-identified messages.

The on-hold messaging system on server 306 delivers the selected message from database 312 to the on-hold caller 302 over network 304. When the caller 310 takes the caller 302 off hold, the server 306 stops the playback of the selected message and reconnects the caller 302 with the caller 310.

Figure 4:
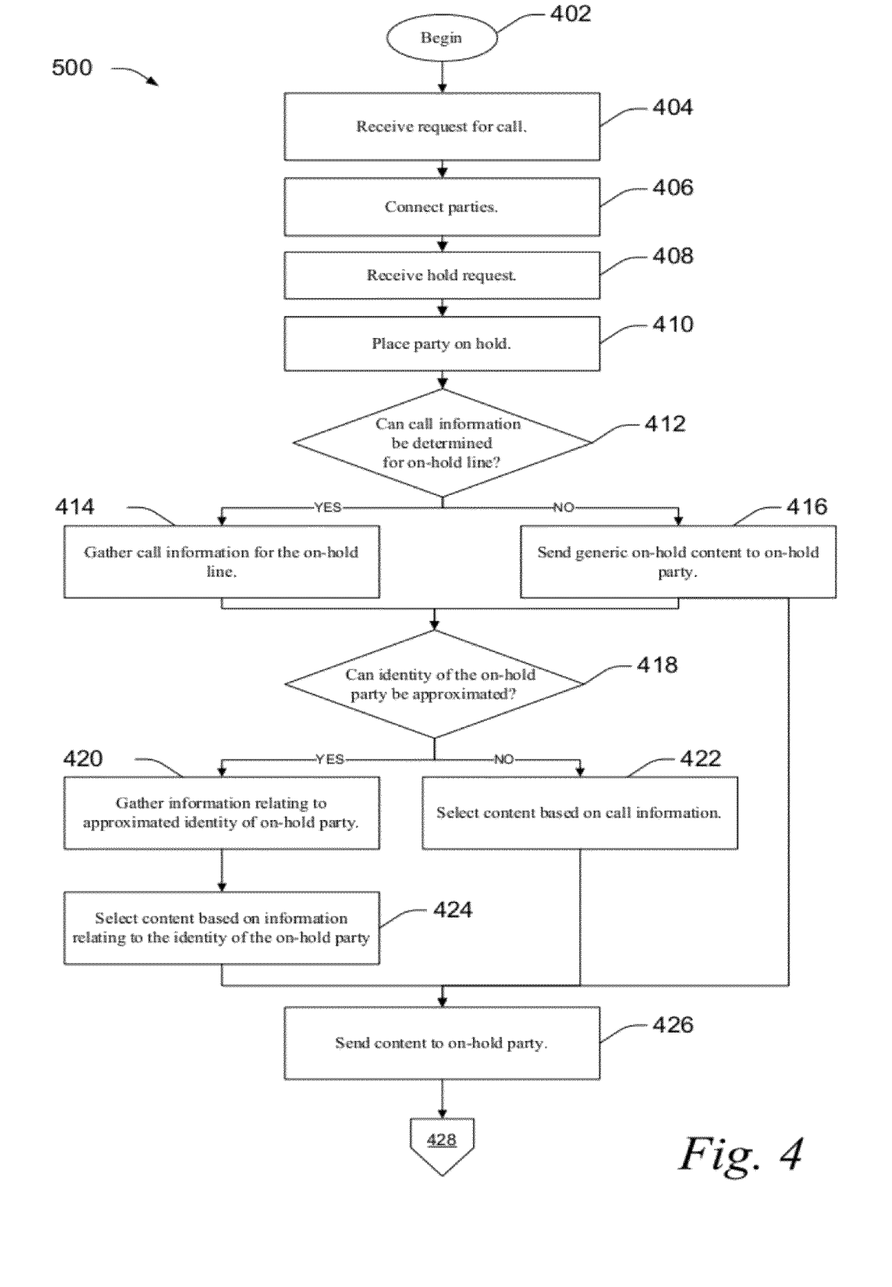
FIG. 4 is a flowchart summarizing Applicant's method for delivering targeted informational messages via on-hold messaging.

Referring to FIG. 4, a flowchart 400 of an exemplary method for delivering targeted information messages via on-hold messaging is depicted. The method begins at step 402. A request for a call is received by the system at step 404. In one embodiment, the call is initiated by one of the ultimate parties to the call. In one embodiment, the call is initiated by an individual or system that contacts each of the ultimate parties to the call. The system connects the parties at step 406. In one embodiment, the parties are connected over a PSTN, PBX, VOIP system, or combination thereof.

The method receives a request to place a party on hold at step 408 and places the party on hold at step 410. The method determines if call information can be determined for the on-hold line at step 412. If the method determines that information can be determined for the on-hold line, the method transitions to step 414.

The method gathers call information for the on-hold line at step 414. In one embodiment, the call information includes Caller ID information. In one embodiment, the information includes any other information available on the system over which the call is placed. The method transitions to step 418.

If the method determines that information cannot be determined for the on-hold line, the method transitions to step 416. The method sends a non-targeted on-hold message to the on-hold party in step 416. In one embodiment, the non-targeted on-hold message includes a message of general relevance that is not targeted to the caller or the perceived identity of the caller. The method transitions to step 418.

The method determines whether the identity of the on-hold party can be approximated at step 418. For clarity, "approximated" as used herein means a best-guess determination of the identity of the caller based on the call information. Any number of available electronic sources is used to approximate the identity of the caller using call information, including the registration information on line or account and a reverse number lookup directory. If the method determines that the identity of the on-hold party can be approximated, the method transitions to step 420.

The method gathers information relating to the approximated identity of the on-hold party at step 420. Any number of electronic sources are used to gather additional information for the identity, including the electronic white pages and Internet-based social networking sites that contain information about the identified caller, such as LinkedIn, Facebook, MySpace, and Twitter.

Content targeted to the approximated identity is selected from a database of potential content at step 424. In one embodiment, the content is selected by matching information relating to the approximated identity with metadata associated with the content, thereby tailoring the content to the approximated identity.

If the method determines that the identity of the on-hold party cannot be approximated in step 418, the method transitions to step 422. Content is selected based on call information at step 422 because the more specific identity-based information is not available. The selected content is sent to the on-hold party at step 426. The method optionally ends at 428.

Figure 5:
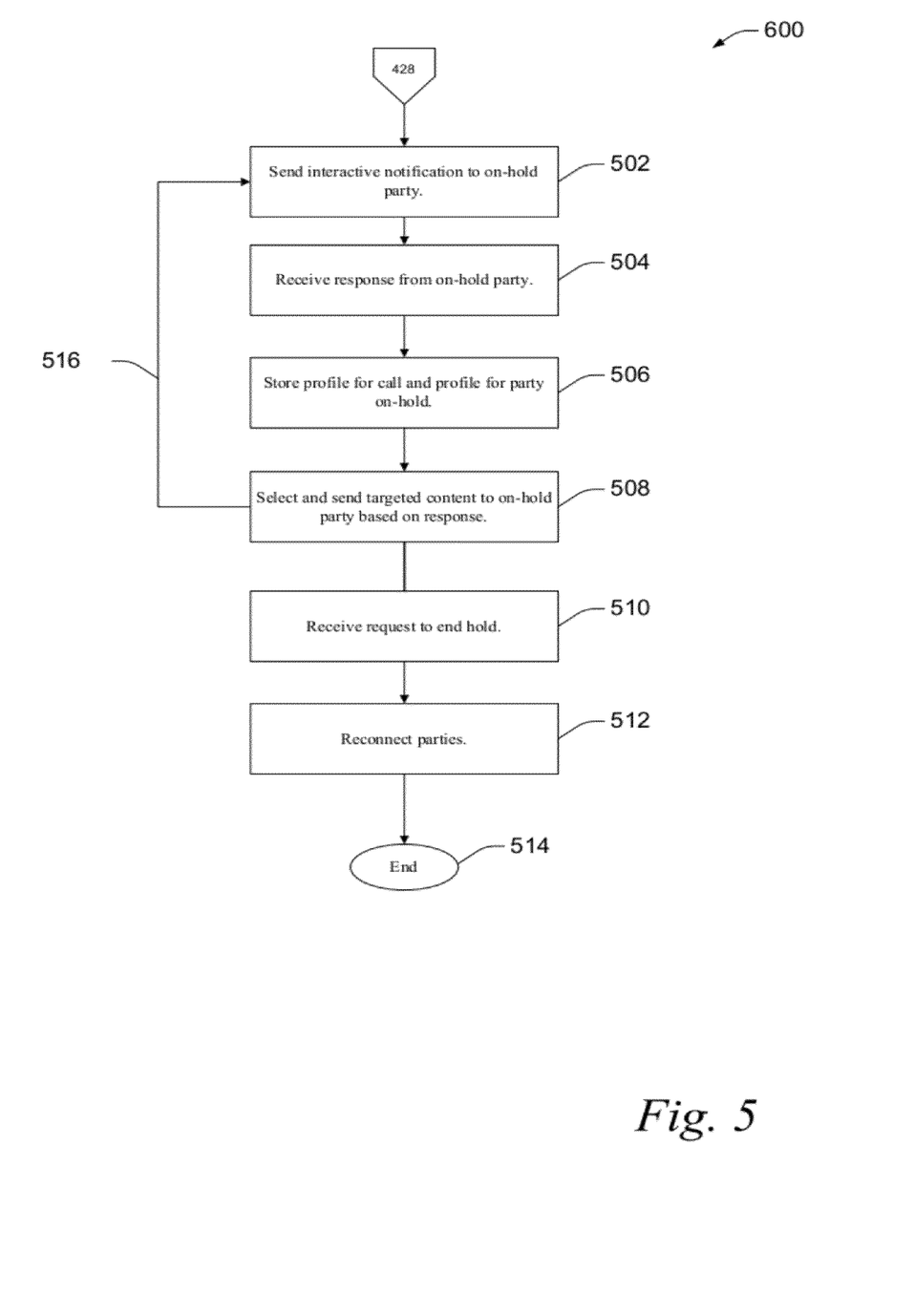
FIG. 5 is a flowchart summarizing Applicant's method for delivering targeted informational messages via on-hold messaging that allows for caller interaction.

Referring to FIG. 5 a flowchart 500 depicting an exemplary method for delivering targeted information messages via on-hold messaging that allows for caller interaction is depicted. The method begins at 428 with a party on hold, or optionally continues from 428 on FIG. 4. An interactive notification is sent to the on-hold party at step 502 and a response is received from the on-hold party at step 504.

In different embodiments, the notification may request that the on-hold party respond to a poll or indicate interest in a product via keys on the phone. In one embodiment, the notification request may permit the on-hold party to make a purchase, for example, to purchase the music playing in the background. In one embodiment, the notification may allow a verbal response. In one embodiment, the notification may allow the on-hold caller to announce a favorite song, upon which the requested song will be played as the on-hold content.

In one embodiment, profiles are created/updated for the call and party on-hold at step 506. The call profile is identified by the call information, such as the phone number or account identifier. The party-on-hold information, when such information can be determined, is more specific information relating to the approximated identity of the on-hold party. The content of the profiles includes any interactive feedback from the on-hold party. The profiles are stored in a database and are used in later calls to improve the selection of targeted content and to enhance the interactive experience.

Content based on the on-hold party's response is sent to the on-hold party at step 508. The method may repeat this interactive process any number of times while the party is on hold, as indicated by arrow 516. A response to end the hold is received at step 510. The parties are reconnected at step 512. The method ends at step 514.

Figure 6:
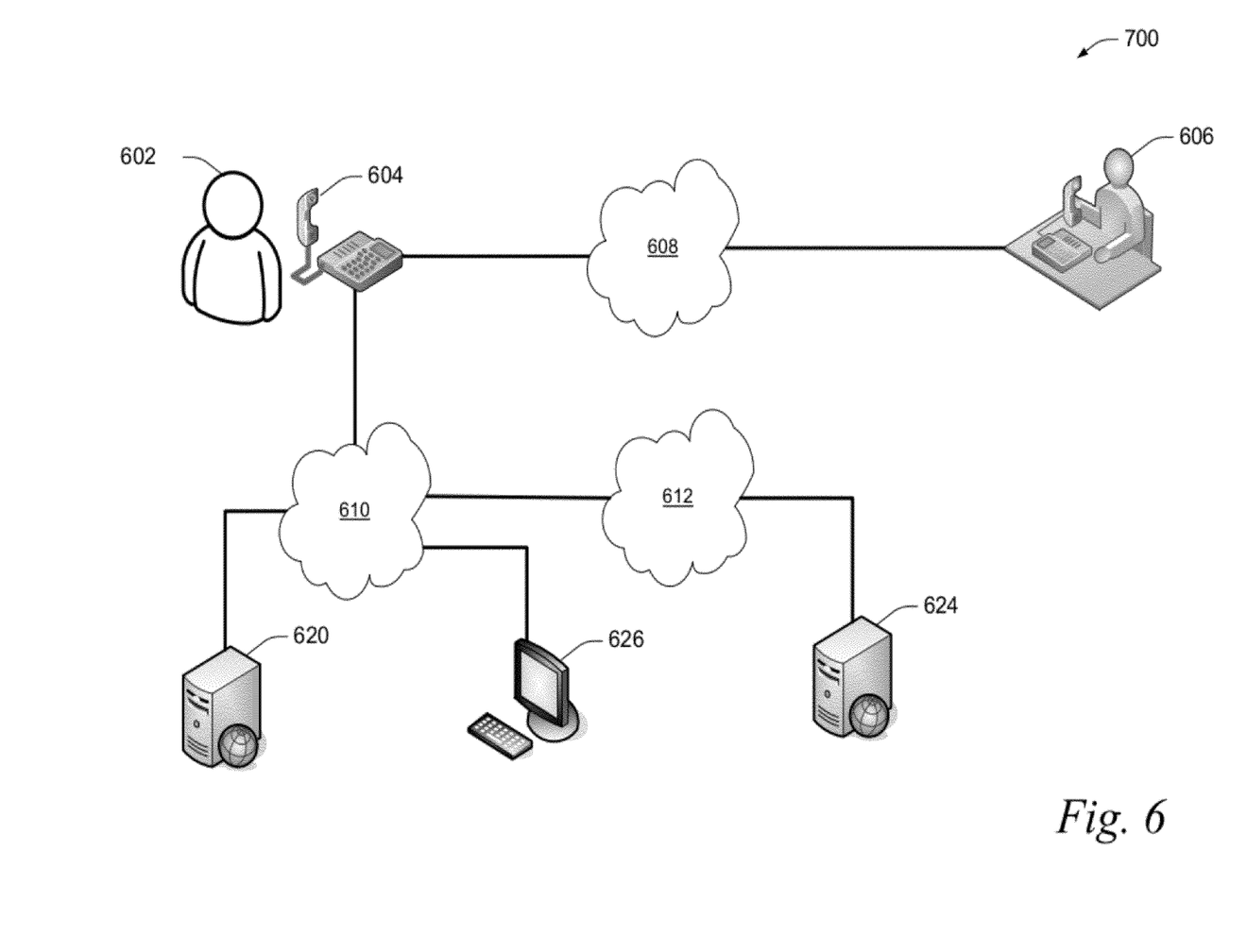
FIG. 6 is a block diagram depicting an exemplary system for delivering personal and secure informational messages via on-hold messaging for phone calls using the caller's private information.

Referring to FIG. 6, a block diagram 600 of an exemplary system for delivering personal and secure informational messages via on-hold messaging for phone calls using the caller's private information is depicted. A caller 602 engages in a call using phone 604. In one embodiment, the caller 602 initiates the call. In one embodiment, the call is initiated by a party other than the caller 602.

In different embodiments, the phone 604 is a smart phone, an iPhone, an iPad, a personal computer, or other programmable communication device. The phone 604 includes an on-hold messaging system implemented in hardware or software. In one embodiment, the phone 604 includes location services, such as a global positioning system (GPS) technology or network based technology to identify the physical location of the phone 604. The phone 604 is connected to a network 610. In different embodiments, the network 610 is a private network or the Internet. In one embodiment, the network 610 is a direct connection to another device using Bluetooth or other data communication protocol.

The call is connected through a network 608 to caller 606. In one embodiment, the network 608 is the Internet. During the call, the caller 602 is placed on hold. In one embodiment, the phone 604 receives an on-hold signal from the network 608. In one embodiment, the phone 604 detects that the caller 602 has been placed on hold.

The on-hold messaging system on the phone 604 gathers personal information relating to the caller 602. In this embodiment, the phone 604 is the caller's 602 personal phone and is therefore used nearly exclusively by caller 602. The phone 604 has access to the caller's 602 personal information, such as the caller's 602 electronic calendar, email, or electronic task list. In different embodiments, the information is available on the caller's personal computer 626, a server at the caller's place of employment 620, or managed storage 624 available over the Internet 612.

The on-hold messaging system gathers pertinent information from these electronic sources as well as information from the phone 604, including location information. Next, the system creates an on-hold message based on the information, and plays the on-hold message to the caller 602 while on hold. For example, while the caller 602 is on hold, the on-hold messaging system on phone 604 determines that a contact's birthday is next week. The system will create an audio message based on this information using text-to-speech technology and play the message to the caller 602.

In another embodiment, the on-hold messaging system uses the caller's 602 personal information to select a message, such as an advertisement or public service message, from a database of messages on a managed cloud-based storage 624.

This embodiment enables the on-hold messaging system to utilize information highly targeted to the caller 602 without disclosing the caller's 602 personal information to any other parties.

Figure 7:
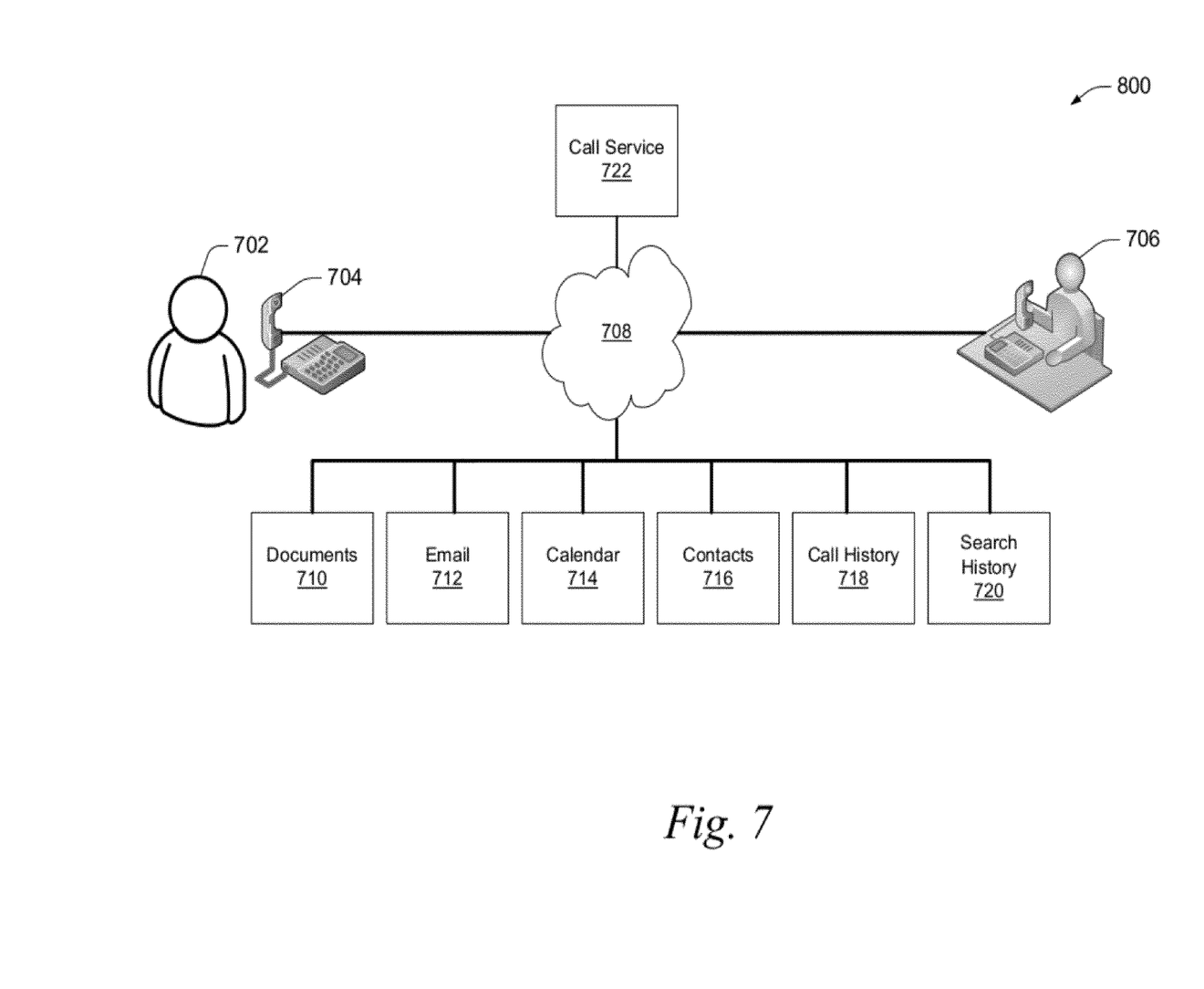
FIG. 7 is a block diagram depicting another exemplary system for delivering personal and secure informational messages via on-hold messaging for phone calls using the caller's private information.

Referring to FIG. 7, a block diagram 700 of another exemplary system for delivering personal and secure informational messages via on-hold messaging using the caller's private information is depicted. A caller 702 engages in a call with caller 706 using phone 704. In one embodiment, the caller 702 initiates the call. In one embodiment, the call is initiated by a party other than the caller 702.

In different embodiments, the phone 704 is a smart phone, an iPhone, an iPad, a personal computer or other programmable communication device, a cell phone, or a traditional phone. The phone 704 is connected to a communications network 708. In different embodiments, the communications network 710 is a private network, the Internet, a PSTN, a PBX, or combination thereof.

The call is managed by an Internet cloud-based service 722. In one embodiment, the service 722 includes other services, such as document storage 710, email 712, calendar 714, contact management 716, call history 718, and Internet search history 720. In one embodiment, the services 710-722 are provided by a single provider, such as Google. In one embodiment, the provider of the calling services 722 does not provide the services 710-720, but is capable of logging into the caller's account 702 on services provided by other providers, such as Google, Yahoo, and Hotmail.

The call is connected through a network 708 to caller 706. During the call, the caller 702 is placed on hold. The call service 722 selects a message from a collection of available messages. The selection is based on the caller's 702 information gathered from services 710-720. In one embodiment, the message is an advertisement. In one embodiment, the message is a public service announcement. In one embodiment, the message comprises content derived from the caller's 702 personal information extracted from services 710-720, such as a meeting or birthday reminder. The unity of information described in this embodiment permits extremely precise targeted messaging to caller 702.

Figure 8:
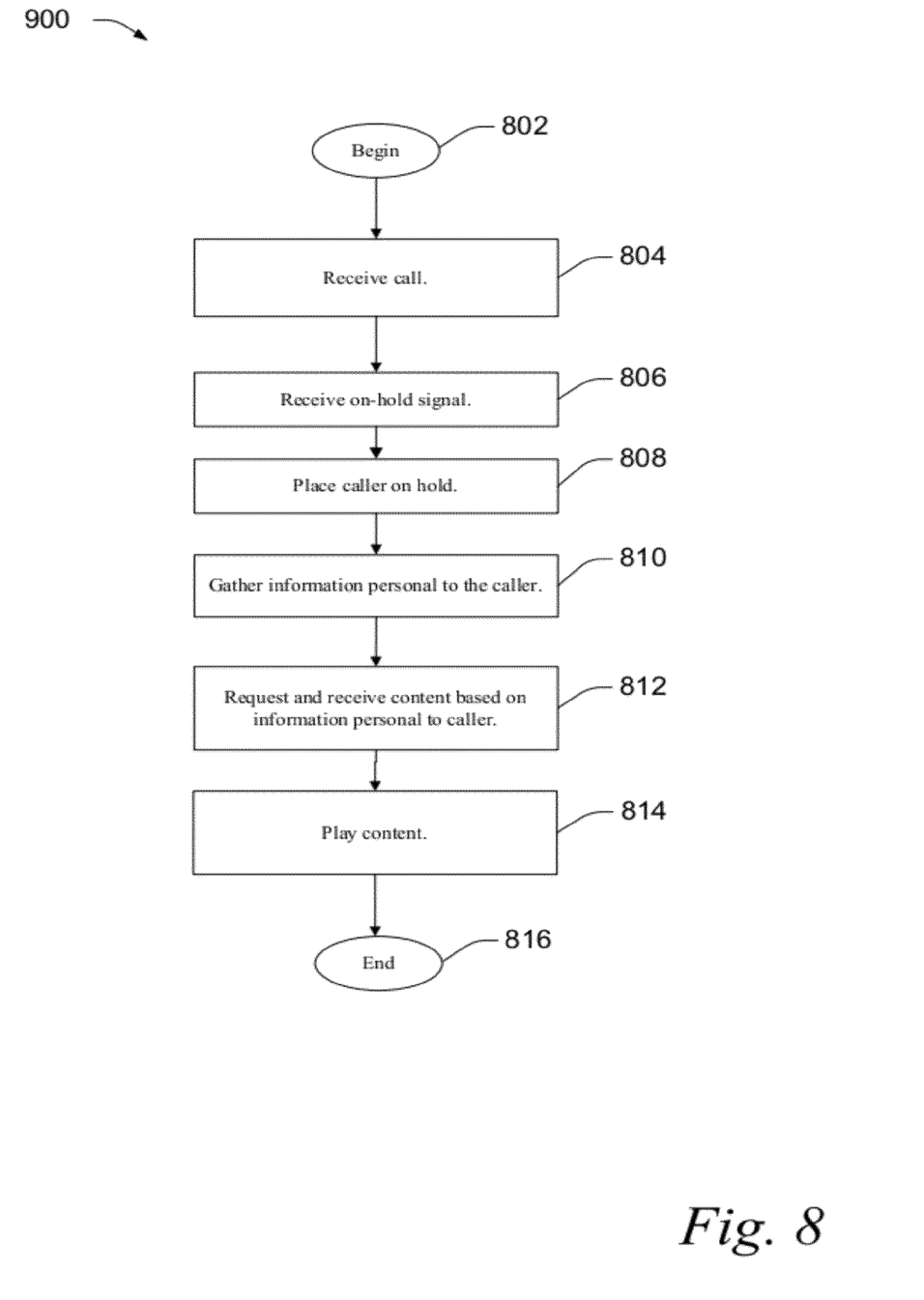
FIG. 8 is a flowchart summarizing Applicant's method for delivering personal and secure informational messages via on-hold messaging for phone calls using the caller's private information.

Referring to FIG. 8, a flowchart 800 of an exemplary method for delivering personal and secure informational messages via on-hold messaging for phone calls using the caller's private information is depicted. The method begins at step 802. A call is received at step 804. An on-hold signal is received at 806 and the caller is placed on hold at step 808.

Information personal to the caller is gathered at step 810. The information is gathered from network based services, such as Internet based email, calendar, document storage, and search services. Caller-targeted content is created based on the information personal to the caller at step 812. In one embodiment, the caller-targeted content is dynamically created, for example, using text to speech technology, based on the information personal to the caller. In one embodiment, the caller-targeted information is selected from a collection of preexisting messages, such as advertisements, public service messages, weather alerts, stock quotes, and breaking news. The content is played for the caller at step 814 and the method ends at step 816.

Figure 9:
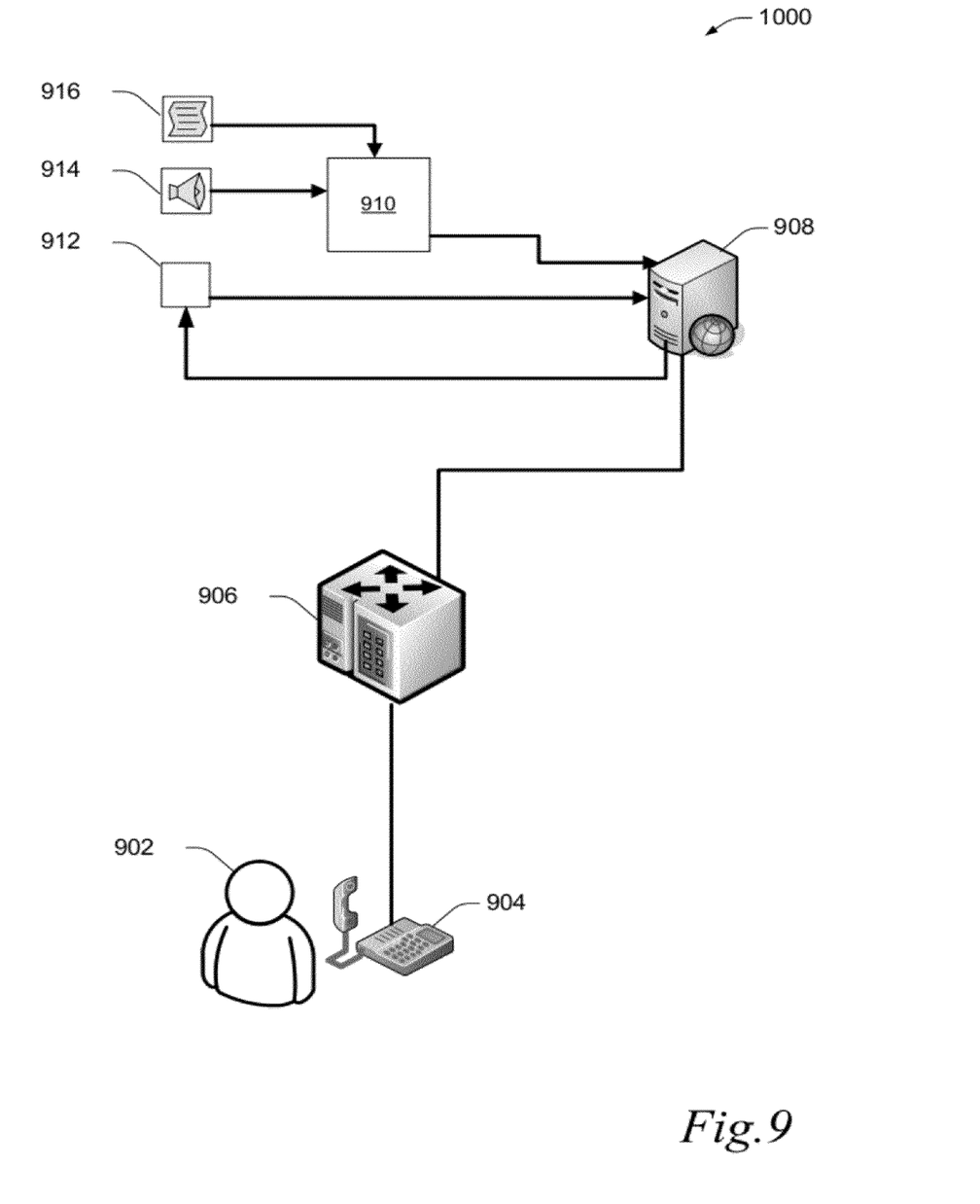
FIG. 9 is a block diagram depicting an exemplary system for creating targeted informational messages that automatically adapts to caller feedback over time.

Referring to FIG. 9, a block diagram 900 of an exemplary system for delivering targeted information via on-hold messaging that automatically adapts to call feedback over time is depicted. A caller 902 engages in a phone call using phone 904 through a communications network 906. In different embodiments, the communications network 906 is a PSTN, PBX, VOIP or other protocol, or any combinations thereof.

An on-hold messaging server 908 is in communication with communications network 906. The on-hold messaging server 908 provides on-hold messages to the caller 902 while the caller 902 is on hold. The on-hold messaging server 908 contains a collection of on-hold messages, associated metadata, and call and caller profiles. The metadata and profiles enable the on-hold messaging server 908 to select a targeted message based on the on-hold call or caller information.

In one embodiment a message is created by providing audio 914 and metadata 916, which are packaged into a targeted message 910. A collection of targeted messages 910 are added to the database on, or accessible by, the on-hold messaging server 908. Call and caller profiles 912 are also added to the database on, or accessible by, the on-hold messaging server 908. The profiles contain information relating to the call (i.e., phone number), such as history of on-hold time, the history of content played for the call, and history of caller interaction. The profiles also contain information relating to the caller, such as on-hold history and interaction history.

When the caller 902 is placed on hold, the on-hold messaging server 908 delivers targeted message content to the caller 902 through the communications network 906. The on-hold messaging server 908 will solicit caller 902 interaction by prompting caller to select a number on the keypad or speak a word or phrase. For example, the on-hold messaging server 908 may ask the caller 902 if he drinks coffee. The caller's 902 answer will be received by the on-hold messaging server 908. The on-hold messaging server 908 will then update the caller's profile 912, or will create a new profile 912 if one does not exist, with a record of the caller's 902 responses (or non-responses).

Figure 10A:
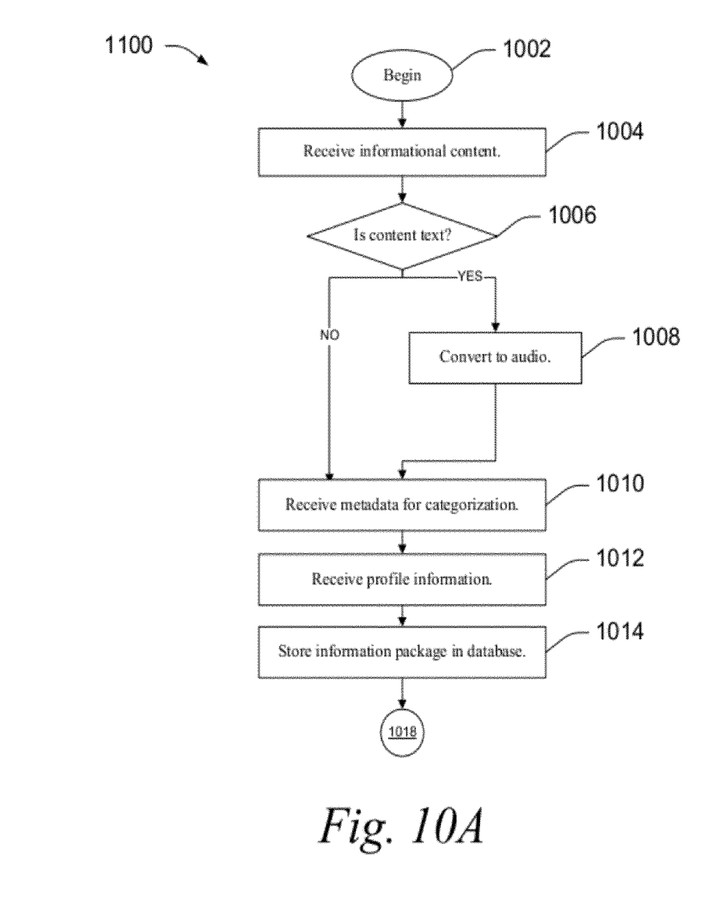
FIGS. 10(a)-10(b) are flowcharts summarizing Applicant's method for delivering targeted information via on-hold messaging that automatically adapts to call feedback over time.

Referring to FIG. 10(a), a flowchart 1000 of an exemplary method for creating targeted on-hold messages is depicted. The method begins at 1002. The on-hold messaging system receives informational content at step 1004, which may be in textual or audio format. The method determines if the content is in textual format at step 1006. If the method determines that the content is in textual format, the method transitions to step 1008. The textual content is converted into an audio format at step 1008.

If the content is not in textual format, the method transitions to step 1010. Metadata relating to the content is received at step 1010. The metadata is used to categorize the content and enables the on-hold messaging system to select targeted content based on call or caller information.

Profile information is received at step 1012. The profile information is gathered based on caller feedback during an on-hold message. The profile information is used to supplement the metadata received in step 1010 to improve the ability of the on-hold messaging system to target callers. The content, metadata, and profile information is stored in the on-hold messaging database. The method optionally ends at 1018, or optionally continues to FIG. 10(b).

Figure 10B:
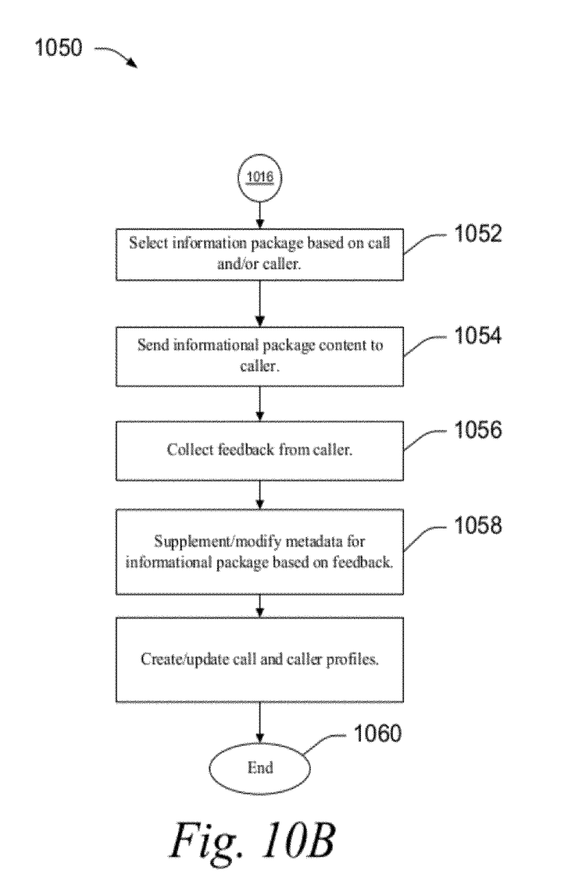

Referring to FIG. 10(b), a flowchart 1050 of an exemplary method for improving the performance of on-hold message delivery by adapting to feedback over time is depicted. The method begins at 1016 or optionally continues from FIG. 10(a). A targeted message selected based on call or caller information is selected at step 1052. The content is sent to the on-hold caller at step 1054.

The on-hold caller is given an opportunity to interact with the on-hold messaging system by entering numbers on the phone keypad or providing verbal responses. The feedback provided by the caller is collected at step 1056. The feedback provided by the caller is used to supplement the metadata associated with the targeted message at step 1058. The feedback provided by the caller is also used to create (or update) profiles for the call or caller. The profiles are used to better target content in future on-hold messages. The method ends at step 1060.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Electronic devices, including computers, servers, cell phone, smart phone, and Internet-connected devices, have been described as including a processor controlled by instructions stored in a memory. The memory may be random access memory (RAM), read-only memory (ROM), flash memory or any other memory, or combination thereof, suitable for storing control software or other instructions and data. Some of the functions performed by these electronic devices have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

In certain embodiments, individual steps recited in FIGS. 1A, 1B, 4, 5, 8, 10A, and 10B, may be combined, eliminated, or reordered.

In certain embodiments, Applicants' invention includes instructions residing in one or more non-transitory computer readable media, wherein those instructions are executed by a programmable processor disposed in an article of manufacture to perform one or more of the steps recited in FIG. 1A, and/or one or more of steps recited in FIG. 1B, and/or one or more of the steps recited in FIG. 4, and/or one or more of steps recited in FIG. 5, and/or one or more of the steps recited in FIGS. 8, 10A and 10B.

In other embodiments, Applicants' invention includes instructions residing in any other computer program product, where those instructions are executed by a computing device to perform one or more of the steps recited in FIG. 1A, and/or one or more of steps recited in FIG. 1B, and/or one or more of the steps recited in FIG. 4, and/or one or more of steps recited in FIG. 5, and/or one or more of the steps recited in FIGS. 8, 10A and 10B. In either case, the instructions may be encoded in an information storage medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the invention is described through the above-described exemplary embodiments, it will be understood by those of ordinary skill in the art that modifications to, and variations of, the illustrated embodiments may be made without departing from the inventive concepts disclosed herein. For example, although some aspects of a method for delivering targeted information has been described with reference to flowcharts, those skilled in the art should readily appreciate that functions, operations, decisions, etc. of all or a portion of each block, or a combination of blocks, of the flowchart may be combined, separated into separate operations or performed in other orders. Moreover, while the embodiments are described in connection with various illustrative data structures, one skilled in the art will recognize that the system may be embodied using a variety of data structures. Furthermore, disclosed aspects, or portions of these aspects, may be combined in ways not listed above. Accordingly, the invention should not be viewed as being limited to the disclosed embodiment(s).

I claim:

1. A method for providing on-hold messaging, comprising:
   placing a telephone call via a telephone switching system, said call being placed by a caller to a target, wherein said caller is placed on hold immediately upon placing said call, and wherein said on-hold messaging computer is external to a telephone utilized by either said caller or said target, and wherein said telephone switching system is external to but in communication with an on-hold messaging computer;
   generating caller information by said on-hold messaging computer;
   selecting by said on-hold messaging computer a first message based on said caller information;
   reciting by said on-hold messaging computer said first message prior to said target answering said telephone call;
   detecting that said target answers said telephone call;
   terminating and saving said first selected message
   determining that said caller terminates said telephone call;
   determining if said target remains on the line;
   operative if said target remains on the line,
   resume reciting said first message;
   completing said first message;
   determining if said target remains on the line;
   operative if said target remains on the line,
   selecting a second message based upon said target information;
   reciting said second message.

2. The method of claim 1, further comprising:
   generating target information;
   selecting said first message based upon said target information.

3. The method of claim 1, further comprising:
   determining that said caller terminates said telephone call;
   determining if said target remains on the line;
   operative if said target does not remain on the line,
   ending said telephone call.

4. The method of claim 1, further comprising:
   completing said first message;
   determining if said target remains on the line;
   operative if said target does not remain on the line,
   ending said telephone call.

5. The method of claim 1, further comprising:
   determining that said target terminates said telephone call;
   determining if said caller remains on the line;
   operative if said caller remains on the line,
   resume reciting said first message.

6. The method of claim 5, further comprising:
completing said first message;
determining if said caller remains on the line;
operative if said caller does not remain on the line,
ending said telephone call.

7. The method of claim 5, further comprising:
completing said first message;
determining if said caller remains on the line;
operative if said caller remains on the line,
selecting a second message based upon said caller information;
reciting said second message.

8. An on-hold computer comprising a processor a non-transitory computer readable medium comprising computer readable program code encoded therein to provide on-hold messaging, wherein said on-hold messaging computer is external to a telephone utilized by said caller and external to a target, the computer readable program code comprising a series of computer readable program steps to effect:
receiving a telephone call placed by a caller to a target, wherein said caller is placed on hold immediately upon placing said call;
generating caller information;
selecting a first message based on said caller information;
reciting said first message prior to said target answering said telephone call;
detecting that said target answers said telephone call;
terminating and saving said first selected message;
determining that said caller terminates said telephone call;
determining if said target remains on the line;
operative if said target remains on the line,
resume reciting said first message;
completing said first message;
determining if said target remains on the line;
operative if said target remains on the line,
selecting a second message based upon said target information;
reciting said second message.

9. The on-hold computer of claim 8, said computer readable program code further comprising a series of computer readable program steps to effect:
generating target information;
selecting said first message based upon said target information.

10. The on-hold computer of claim 8, said computer readable program code further comprising a series of computer readable program steps to effect:
determining that said caller terminates said telephone call;
determining if said target remains on the line;
operative if said target does not remain on the line,
ending said telephone call.

11. The on-hold computer of claim 8, said computer readable program code further comprising a series of computer readable program steps to effect:
completing said first message;
determining if said target remains on the line;
operative if said target does not remain on the line,
ending said telephone call.

12. The on-hold computer of claim 8, said computer readable program code further comprising a series of computer readable program steps to effect:
determining that said target terminates said telephone call;
determining if said caller remains on the line;
operative if said caller remains on the line,
resume reciting said first message.

13. The on-hold computer of claim 12, said computer readable program code further comprising a series of computer readable program steps to effect:
completing said first message;
determining if said caller remains on the line;
operative if said caller does not remain on the line,
ending said telephone call.

14. The on-hold computer of claim 12, said computer readable program code further comprising a series of computer readable program steps to effect:
completing said first message;
determining if said caller remains on the line;
operative if said caller remains on the line,
selecting a second message based upon said caller information;
reciting said second message.

* * * * *